(12) United States Patent
Meseth

(10) Patent No.: US 6,865,244 B2
(45) Date of Patent: Mar. 8, 2005

(54) DEVICE AND METHOD FOR COOLING A REACTOR PRESSURE VESSEL OF A BOILING WATER REACTOR PLANT

(75) Inventor: Johann Meseth, Dieburg (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 10/298,399

(22) Filed: Nov. 18, 2002

(65) Prior Publication Data

US 2003/0138072 A1 Jul. 24, 2003

(30) Foreign Application Priority Data

Nov. 16, 2001 (DE) .......................................... 101 56 495

(51) Int. Cl.[7] .................................................. G21C 9/00
(52) U.S. Cl. ....................... 376/282; 376/277; 376/247; 376/258
(58) Field of Search ................................ 376/247, 258, 376/282, 292, 277; 137/206

(56) References Cited

U.S. PATENT DOCUMENTS

| | | | | |
|---|---|---|---|---|
| 3,566,904 A | * | 3/1971 | Davis ............................ | 137/206 |
| 4,389,888 A | * | 6/1983 | Morooka ....................... | 73/299 |
| 4,421,716 A | * | 12/1983 | Hench et al. ................. | 376/216 |
| 4,557,890 A | * | 12/1985 | Matsuda et al. .............. | 376/282 |
| 4,716,014 A | | 12/1987 | Cantineau .................... | 376/371 |
| 5,102,616 A | * | 4/1992 | Gardner et al. .............. | 376/282 |
| 5,365,555 A | * | 11/1994 | Sawabe et al. ............... | 376/258 |
| 5,377,243 A | * | 12/1994 | Hill .............................. | 376/283 |
| 5,475,720 A | | 12/1995 | Oldenhage et al. .......... | 376/258 |
| 5,615,239 A | * | 3/1997 | Deaver et al. ............... | 376/247 |
| 5,754,609 A | | 5/1998 | Meseth ......................... | 376/247 |
| 5,825,838 A | * | 10/1998 | Park et al. .................... | 376/299 |

FOREIGN PATENT DOCUMENTS

EP 0 766 813 B1 12/1999

OTHER PUBLICATIONS

Werner Brettschuch et al.: "SWR 1000—der Siedewasserreaktor der Zukunft" [SWR 1000—the boiling water reactor of the future], Siemens Power Journal, 2/96, pp. 18–22.

* cited by examiner

Primary Examiner—Jack Keith
(74) Attorney, Agent, or Firm—Laurence A. Greenberg; Werner H. Stemer; Ralph E. Locher

(57) ABSTRACT

In order to allow a reliable and passive external cooling of a reactor pressure vessel of a boiling water reactor, outside the reactor pressure vessel a differential-pressure measurement pipe is provided and has a first and a second pipe leg which are connected to one another above a critical filling level. The first pipe leg is connected at the height of the critical filling level to the interior of the reactor pressure vessel. In a normal operating state, the differential-pressure measurement pipe is filled completely with water. In the event of the undershooting of the critical filling level, the water flows automatically out of the first pipe leg. As a result, the differential pressure between the two pipe legs rises, the differential pressure being detected by a measurement device via which the flooding of the exterior is then brought about.

11 Claims, 1 Drawing Sheet

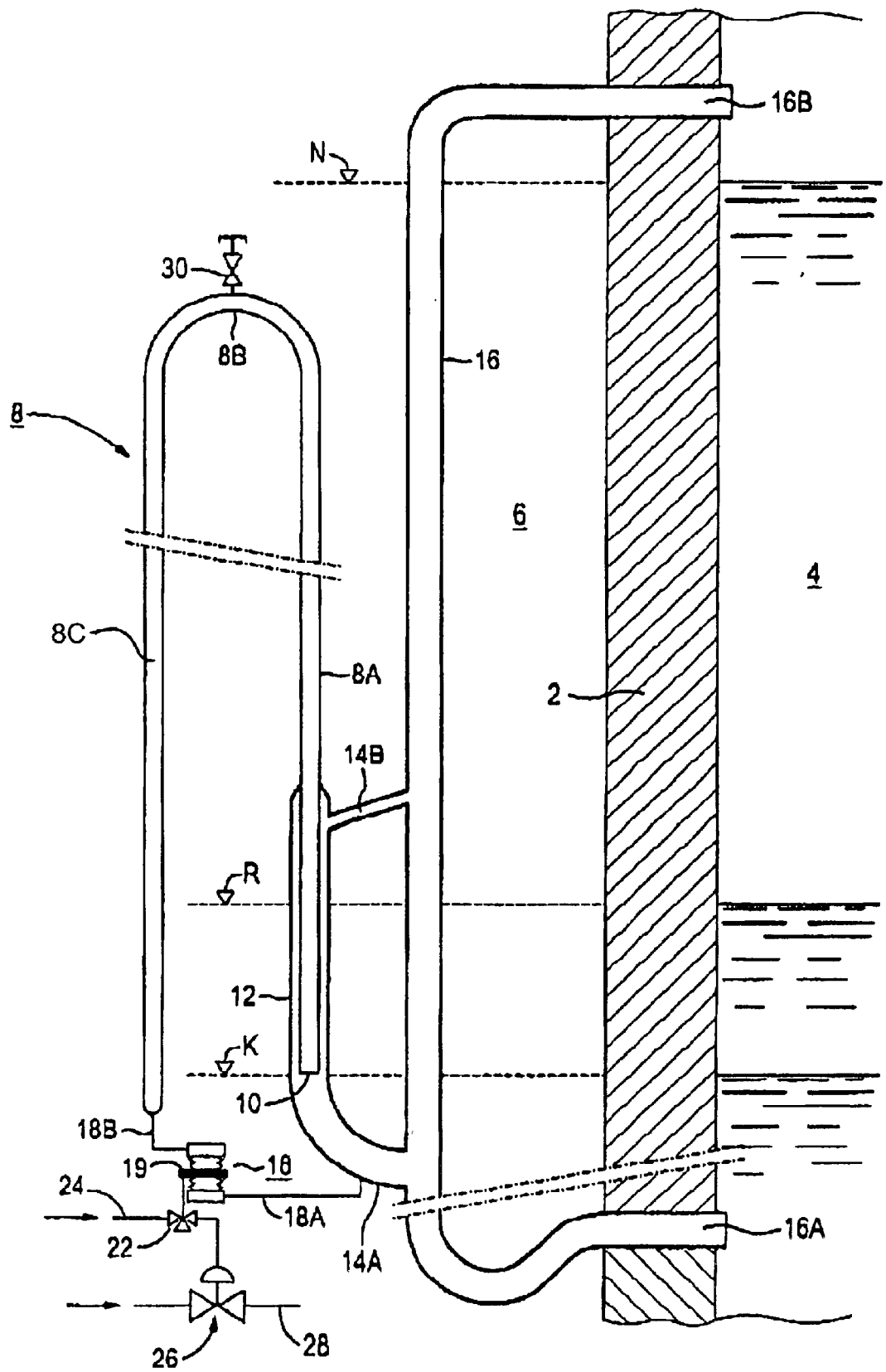

DEVICE AND METHOD FOR COOLING A REACTOR PRESSURE VESSEL OF A BOILING WATER REACTOR PLANT

BACKGROUND OF THE INVENTION

Field of the Invention

The invention relates to a device and a method for cooling a reactor pressure vessel of a boiling water reactor plant.

A concept for a modern boiling water reactor plant is described, for example, in the Siemens article SWR 1000 titled "Der Siedewasser-Reaktor der Zukunft" ["The Boiling Water Reactor Of The Future"], published in the Siemens Power Journal February 1996, pages 18–22. The boiling water reactor concept described in this is distinguished, in particular, by its passive safety configurations. The reactor pressure vessel is disposed within a safety container that has, inter alia, a flood pool, from which a flood line issues into the reactor pressure vessel. In an emergency, cooling water is introduced through the flood line from the flood pool into the reactor pressure vessel solely by force of gravity. Should this "internal cooling" of the reactor pressure vessel fail, it is alternatively flooded from the outside and consequently cooled. The "external cooling" is to be triggered passively in the event of a lower filling level than the internal flooding (critical filling level).

During operation, the reactor pressure vessel of the boiling water reactor is filled with water up to a normal filling level. Above the normal filling level, a steam space follows. An important criterion for ensuring reliable operation, in particular for ensuring a sufficient cooling of the reactor, is the filling level. If this undershoots a critical filling level, the introduction of a special cooling measure takes place. To monitor the filling level, a riser pipe running parallel to the reactor is conventionally provided, which is connected in a communicating manner to the interior of the reactor pressure vessel, so that a filling level corresponding to the filling level in the reactor pressure vessel is established in the riser pipe. The actual filling level in the reactor pressure vessel is determined via a pressure measurement in the riser pipe. Such configurations for determining the filling level may be gathered, for example, from U.S. Pat. No. 5,475,720 or from U.S. Pat. No. 4,716,014. In these systems, however, there is the risk that noncondensable gases that may seriously falsify the measurement result will accumulate in the pipeline system of the riser pipe. A concept for eliminating the disturbing influences of the noncondensable gases is described in European Patent EP 0 766 813 B1, corresponding to U.S. Pat. No. 5,754,609. The known systems for measuring the filling level therefore require a very high outlay in a disadvantageous way.

SUMMARY OF THE INVENTION

It is accordingly an object of the invention to provide a device and a method for cooling a reactor pressure vessel of a boiling water reactor plant which overcome the above-mentioned disadvantages of the prior art devices and methods of this general type, which allows an operationally reliable and simple cooling of a reactor pressure vessel in the event of the undershooting of a critical filling level.

With the foregoing and other objects in view there is provided, in accordance with the invention, a device for cooling a reactor pressure vessel of a boiling water reactor plant. The device containing a differential-pressure measurement pipe disposed outside the reactor pressure vessel. The differential-pressure measurement pipe has a first pipe leg and a second pipe leg connected to one another above a critical filling level of the reactor pressure vessel. The first pipe leg is flow-connected at a height of the critical filling level to an interior of the reactor pressure vessel. A measurement device is coupled to the differential-pressure measurement pipe for detecting a differential pressure existing between the first and second pipe legs. In an event of an overshooting of a triggering differential pressure the measurement device initiating a cooling of the reactor pressure vessel.

The object is achieved, according to the invention, by the device for cooling the reactor pressure vessel of a boiling water reactor plant, in which, outside the reactor pressure vessel, a differential-pressure measurement pipe is provided, having a first and a second pipe leg which are connected to one another above a critical filling level. In this case, the first pipe leg is flow-connected to the interior of the reactor pressure vessel below the critical filling level. Furthermore, a measurement device for detecting a differential pressure existing between the two pipe legs is provided. The measurement device is configured in such a way that, in the event of the overshooting of a triggering differential pressure, the cooling of the reactor pressure vessel, in particular external cooling, is initiated.

The configuration is based on the fundamental idea of detecting the undershooting of the critical filling level virtually directly. For this purpose, the differential-pressure measurement pipe, configured, in particular, in the manner of an upside-down U-pipe, is provided. The differential-pressure measurement pipe is connected by its first pipe leg to the interior of the reactor pressure vessel. During normal operation, the differential-pressure measurement pipe is filled completely with water. There is virtually no differential pressure between the two pipe legs, in particular approximately at the height of the critical filling level. This is intended to mean that the pressure difference is much lower than 0.1 bar. If the water in the reactor pressure vessel then undershoots the critical filling level, the water flows out of the first pipe leg due to the flow connection of the latter to the reactor pressure vessel and steam from the reactor pressure vessel flows in. By the flow connection of the first pipe leg to the interior is therefore to be meant any connection to the interior that ensures an at least partial outflow of the water from the first pipe leg in the event of the undershooting of the critical filling level in the reactor pressure vessel. The differential pressure between the first pipe leg that is then run empty and the second pipe leg that continues to be filled with water increases markedly. Typically, the pressure difference rises to a value of the order of magnitude of 0.5 to 1 bar. This differential pressure is detected by the measurement device that thereupon initiates suitable measures for the external cooling of the reactor pressure vessel.

The decisive advantage of the device is to be seen in that, in the event of the undershooting of the critical filling level, the measurement device detects a marked rise in the pressure difference reliably and without any doubt. What is critical for this is that the water flows out of the second pipe leg preferably completely. No complicated evaluation technology and, in particular, no conductor technology is required in order to detect the undershooting of the critical filling level. The risk of measurement or calibration errors is thereby ruled out. At the same time, overall, passive detection and triggering of emergency cooling becomes possible. By "passive", in this context, it is meant that the entire system manages without any control electronics or other actively activatable parts in order to detect the undershooting of the critical filling level and intervention by maintenance personnel is also not necessary. A high degree of safety is achieved as a result.

According to one preferred development, the first pipe leg is surrounded at least in the lower region, near the critical filling level, by a jacket pipe that is connected in a communicating manner to the interior of the reactor pressure vessel. The differential-pressure measurement pipe is therefore configured in the manner of a double pipe, with the first pipe leg as the inner pipe and with the jacket pipe as the concentrically disposed outer pipe. By virtue of the communicating connection of the jacket pipe to the interior of the reactor pressure vessel, a filling level corresponding to the filling level prevailing in the reactor pressure vessel is established in the jacket pipe. The result of this is that, in the event of a lowering of the filling level, the upper region of the jacket pipe is gradually filled with steam, as a consequence of which the inner pipe, that is to say the first pipe leg, heats up. By virtue of this measure, the occurrence of what may be referred to as condensation hammers, which would lead to high mechanical load, is avoided. Without this preheating, in the event of the undershooting of the critical filling level, the inner pipe would be directly acted upon, after the cold water had run out, by hot steam which would then condense abruptly on the cold inner pipe and give rise to what may be referred to as condensation hammers.

In order to allow particularly expedient connection between the jacket pipe and the interior of the reactor pressure vessel, the jacket pipe is advantageously connected via a first flow path to the interior of the reactor pressure vessel above the critical filling level and by a second flow path to the interior below the critical filling level.

With a view to as simple an embodiment as possible, the lower end of the first pipe leg, that is to say the lower end of the inner pipe, is open and is disposed, within the jacket pipe, at the height of the critical filling level. By this embodiment, the critical filling level can be virtually set in a simple way due to the lower open end being disposed at a desired height. The first pipe leg is connected indirectly to the reactor pressure vessel via the jacket pipe.

In a preferred embodiment, the differential-pressure measurement pipe is connected to a riser pipe which is disposed outside the reactor pressure vessel and which is connected in a communicating manner to the interior. Preferably, the riser pipe is connected to the interior of the reactor pressure vessel below the critical filling level via a lower issue region and above the critical filling level via an upper issue region. The riser pipe is normally already present and is used in the conventional way, for example, for measuring the filling level in the reactor pressure vessel. By the differential-pressure measurement pipe being connected to the riser pipe, the differential-pressure measurement pipe can also be retrofitted in a simple way into already existing plants, without perforations on the reactor pressure vessel being necessary.

With a view to as simple an embodiment as possible, the jacket pipe is preferably connected by each of its two flow paths to the riser pipe. Since the riser pipe is itself connected to the reactor pressure vessel via the two issue regions, a filling level corresponding to the filling level in the reactor pressure vessel is established first in the riser pipe and then in the jacket pipe. The jacket pipe is thus connected in a communicating manner to the riser pipe and the latter, in turn, to the interior of the reactor pressure vessel.

In order to avoid the accumulation of gases when the differential-pressure measurement pipe is filled with water for the first time, venting is preferably provided at its highest point.

According to an advantageous embodiment, the measurement device activates a shutoff valve of a flood line that issues into an exterior disposed around the reactor pressure vessel. Thus, as required, the reactor pressure vessel is flooded from outside. Via this external flooding, the heat is transferred outward via the wall of the reactor pressure vessel. For the passive activation of the cooling, the measurement device is expediently connected to a pneumatic valve of a compressed-gas line, and the compressed-gas line is, in turn, connected to the shutoff valve for the activation of the latter.

Conventionally, a nitrogen supply system with an overpressure of 6 bar is available, which is used for the activation of various control fittings and valves. By the activation of the shutoff valve via the compressed-gas line, the outlay in terms of apparatus is kept low and there is the advantage that the necessary energy for activating the shutoff valve can be applied by a relatively low-pressure difference of up to at most about 1 bar.

In order, overall, to allow completely passive activation, that is to say activation without the supply of any extraneous energy and without the intervention of maintenance personnel, the measurement device is configured in the manner of what may be referred to as a passive pulse generator that converts a pressure-difference change into a length change. The pulse generator thus converts pressure energy into kinetic translational energy. The translational movement then activates the pneumatic valve. For this configuration, there is provision, in an expedient development, for the measurement device to be flow-connected, on the one hand, to the first pipe leg via a first measurement line and, on the other hand, to the second pipe leg by a second measurement line. The pressure prevailing in the two pipe legs is transmitted to the measurement device via these two measurement lines.

The advantages and preferred embodiments set forth with regard to the device may also be applied accordingly to the method.

Other features which are considered as characteristic for the invention are set forth in the appended claims.

Although the invention is illustrated and described herein as embodied in a device and a method for cooling a reactor pressure vessel of a boiling water reactor plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a diagrammatic illustration of an exemplary embodiment of a device for cooling a reactor pressure vessel according to the invention.

DESCRIPTION OF THE PREFERRED EMBODIMENTS

Referring now to the single FIGURE of the drawing in detail, there is shown a reactor pressure vessel, of which merely a detail is illustrated, only a lateral outer wall 2 is illustrated, which separates an interior 4 of the reactor pressure vessel from an exterior 6. During normal operation, the interior 4 of the reactor pressure vessel is filled with water up to a normal filling level N. Above the filling level N, the interior 4 is filled with steam. When the filling level undershoots a critical filling level K, external cooling is brought about automatically and in a purely passive way in order to ensure sufficient cooling of the reactor pressure vessel.

An essential element for activating the cooling measure is the configuration of a differential-pressure measurement pipe 8 that is provided in the exterior 6, in the manner of an upside-down U-pipe, parallel to the outer wall 2. The differential-pressure measurement pipe 8 contains a first pipe leg 8A that merges via an arcuate upper connecting portion 8B into a second pipe leg 8C. The two pipe legs 8A, 8C run preferably parallel to one another and also parallel to the outer wall 2. They extend in this case from below in the region of the critical filling level K upward as far as a height below the normal filling level N. While the second pipe leg 8C is essentially closed on an end face, the first pipe leg 8A is flow-connected to the interior 4. The differential-pressure measurement pipe 8 is therefore closed at one end and is connected only at its other end to the interior 4. It is essential, in this case, that the first pipe leg 8A be flow-connected to the interior 4 in the region of the critical filling level K.

In the exemplary embodiment of the FIGURE, the first pipe leg 8A is flow-connected indirectly to the interior 4. Specifically, the first pipe leg 8A extends with its lower region into a jacket pipe 12 and ends with its lower end 10 in the latter. The jacket pipe 12 surrounds the pipe leg 8A concentrically. The lower end 10 is open, so that a flow path out of the first pipe leg 8A into the jacket pipe 12 is formed. At its upper end, the jacket pipe 12 is closed relative to the first pipe leg 8A and is configured to be leak-tight.

The jacket pipe 12, in turn, issues by a first flow path 14A, below the critical filling level K, into a riser pipe 16. The upper region of the jacket pipe 12 is likewise connected to the riser pipe 16 above the critical filling level K via a second flow path 14B. The riser pipe 16, in turn, is connected to the interior 4 of the reactor pressure vessel below the critical filling level K via a lower issue region 16A and above the critical filling level K by an upper issue region 16B. The lower issue region 16A is followed first by a siphon-shaped region of the riser pipe 16 that subsequently runs parallel to the outer wall 2 and therefore also parallel to the differential-pressure measurement pipe 8 upward as far as the upper issue region 16B.

In the FIGURE, the differential-pressure measurement pipe 8, the riser pipe 16 and the outer wall 2 are interrupted in each case by an obliquely running double line illustrated by dashes, in order to make it clear that the illustration in the figure is not true to scale. Overall, a height difference between the lower issue region 16A and the upper issue region 16B is approximately 10 m, depending on the type of reactor.

Furthermore, in the device, a measurement device 18 for detecting the differential pressure between the two pipe legs 8A, 8C is provided. The measurement device 18 is connected via a first measurement line 18A to the arcuately configured first flow path 14A in a region in which the latter issues into the riser pipe 16. Furthermore, the measurement device 18 is connected via a second measurement line 18B to the lower end of the second pipe leg 8C. The lower end is closed with the exception of the flow connection to the measurement device 18. Via the two measurement lines 18A, 18B, the pressure value prevailing in each of the two pipe legs 8A, 8C is flow-transmitted to the measurement device 18.

The measurement device 18 is configured in the manner of a passive pulse generator that converts a change in the pressure values transmitted via the two measurement lines 18A, 18B into an axial movement. For this purpose, the measurement device 18 has provided in it, for example, a pressure plate 19, indicated diagrammatically, one side of which is acted upon by the pressure from the first pipe leg 8A and the other side of which is acted upon by the pressure from the second pipe leg 8C. In the event of a change in the differential pressure between the two pipe legs 8A, 8C, an axial displacement of the pressure plate 19 then takes place. The axial displacement 19 acts on a pneumatic valve 22 that is disposed in a compressed-gas line 24. Normally nitrogen under a pressure of 6 bar is provided in the compressed-gas line 24. The compressed-gas line 24 leads to a shutoff valve 26 that is provided for opening/closing a flood line 28.

A venting valve 30 is provided at the highest point of the differential-pressure measurement pipe 8, which is to say at the upper point of the arcuate portion 8B.

During normal operation, the reactor pressure vessel is filled up to the normal filling level N that lies above the arcuate portion 8B. When the differential-pressure measurement pipe 8 is being filled for the first time, water penetrates from the interior 4, via the lower issue region 16A, via the riser pipe 16 and via the first flow path 14A, into the lower end 10 of the first pipe leg 8A. The differential-pressure measurement pipe 8, together with its two pipe legs 8A, 8C, is thereby filled completely with water. The air contained in the differential-pressure measurement pipe 8 can escape via the venting valve 30 during commissioning. There is therefore no gas located in the differential-pressure measurement pipe 8. In this normal operating state, the pressure values in the two pipe legs 8A, 8C which are detected by the measurement device 18 via the two measurement lines 18A, 18B are also determined by the pressure of the water columns contained in the two pipe legs 8A, 8C. On the precondition that the two measurement lines 18A, 18B issue into the two pipe legs 8A, 8C at about the same height, no or only a slight pressure difference between the two pipe legs 8A, 8C is detected by the measurement device 18. The pressure difference is in this case well below 0.1 bar.

If, then, the filling level in the interior 4 falls to a reduced filling level R between the normal filling level N and the critical filling level K, the reduced filling level R is approximately established also in the riser pipe 16, since the riser pipe 16 is connected in a communicating manner to the interior 4. Since the jacket pipe 12, in turn, is connected in a communicating manner to the riser pipe 16 via the two flow paths 14A, 14B, the reduced filling level R is also approximately established in the jacket pipe 12. Therefore, the jacket pipe 12 is filled with water below the reduced filling level R and with hot steam above the latter. This leads to a heating of the first pipe leg 8A. When steam flows into the jacket pipe 12 for the first time via the second flow path 14B, the steam condenses on the cold first pipe leg 8A. The condensate flows out downward inside the jacket pipe 12 and passes into the reactor pressure vessel again.

If the filling level falls further below the critical filling level K, the heated water contained in the first pipe leg 8A flows completely out of its lower end 10 that is disposed exactly at the height of the critical filling level K. The first pipe leg 8A simultaneously fills with steam. Since the first pipe leg 8A is already preheated by virtue of the configuration of the jacket pipe 12, when the steam flows into the preheated first pipe leg 8A there are no undesirable condensation hammers which would lead to high mechanical load. Since only steam, instead of the water column, is then contained in the first pipe leg 8A, the pressure value transmitted to the measurement device 18 is reduced and the differential pressure between the two pipe legs 8A, 8C that is detected by the measurement device 18 rises, for example, to a value of between 0.5 and 1 bar. As a result of the rise in the pressure difference, the pneumatic valve 22 is actuated via an axial displacement of the pressure plate 19 and the gas provided via the compressed-gas line 24 drives an actuating drive for opening the shutoff valve 26. A flood line 28 that ends in the exterior 6 is thereby opened. The flood line 28 is preferably connected to a water-filled flood pool located at a higher level, so that, with the shutoff valve open, the exterior 6 is flooded with water solely as a consequence of gravity. Heat can consequently be discharged effectively via the outer wall 2 out of the interior 4 into the flooded exterior 6.

The decisive advantage of the device is to be seen in that the activation of the external flooding takes place entirely passively, that is to say without extraneous electrical energy, and reliably, without the intervention of maintenance personnel, in the event of the undershooting of the critical filling level K.

I claim:

1. A device for cooling a reactor pressure vessel of a boiling water reactor plant, the device comprising:
    a differential-pressure measurement pipe disposed outside the reactor pressure vessel, said differential-pressure measurement pipe having a first pipe leg and a second pipe leg connected to one another above a critical filling level of the reactor pressure vessel, said first pipe leg being flow-connected at a height of the critical filling level to an interior of the reactor pressure vessel; and
    a measurement device coupled to said differential-pressure measurement pipe for detecting a differential pressure existing between said first and second pipe legs, said measurement device initiating a cooling of the reactor pressure vessel in an event of an overshooting of a triggering differential pressure.

2. The device according to claim 1, further comprising a jacket pipe surrounding at least a lower region, near the critical filling level, of said first pipe leg, said jacket pipe connected in a communicating manner to the interior of the reactor pressure vessel.

3. The device according to claim 2, wherein said jacket pipe has a first flow path and a second flow path, said jacket pipe connected to the interior of the reactor pressure vessel below the critical filling level through said first flow path and to the interior above the critical filling level through said second flow path.

4. The device according to claim 2, wherein said first pipe leg has a lower end with an opening formed therein and disposed within said jacket pipe at a height of the critical filling level.

5. The device according to claim 2, further comprising a riser pipe connected to said differential-pressure measurement pipe, said riser pipe disposed outside of the reactor pressure vessel and connected in a communicating manner to the interior of the reactor pressure vessel.

6. The device according to claim 5, further comprising a jacket pipe having two flow paths connected to said riser pipe.

7. The device according to claim 1, further comprising venting disposed at a highest point of said differential-pressure measurement pipe.

8. The device according to claim 1, further comprising;
    a flood line issuing into an exterior area disposed outside and around the reactor pressure vessel; and
    a shutoff valve disposed in said flood line, said measurement device activating said shutoff valve.

9. The device according to claim 8, further comprising:
    a compressed-gas line connected to said shutoff valve for activating said shutoff valve; and
    a pneumatic valve connected to said measurement device and disposed in said compressed-gas line.

10. The device according to claim 1, further comprising a first measurement line flow-connecting said first pipe leg to said measurement device and a second measurement line flow-connecting said second pipe leg to said measurement device.

11. A device for cooling a reactor pressure vessel of a boiling water reactor plant, the device comprising:
    a differential-pressure measurement pipe disposed outside the reactor pressure vessel, said differential-pressure measurement pipe having a first pipe leg and a second pipe leg connected to one another above a critical filling level of the reactor pressure vessel, said first pipe leg being flow-connected at a height of the critical filling level to an interior of the reactor pressure vessel;
    a jacket pipe surrounding at least a lower region, near the critical filling level, of said first pipe leg, said jacket pipe connected in a communicating manner to the interior of the reactor pressure vessel for establishing a filling level substantially corresponding to a filling level prevailing in the reactor pressure vessel; and
    a measurement device coupled to said differential-pressure measurement pipe for detecting a differential pressure existing between said first and second pipe legs, said measurement device initiating a cooling of the reactor pressure vessel in an event of an overshooting of a triggering differential pressure.

* * * * *